(12) United States Patent
Noonan (10) Patent No.: US 12,155,762 B2
(45) Date of Patent: *Nov. 26, 2024

(54) SYSTEMS AND METHODS FOR BLOCKCHAIN TRANSACTIONS WITH OFFER AND ACCEPTANCE

(71) Applicant: GMO GlobalSign, Inc., Portsmouth, NH (US)

(72) Inventor: Willow W. Noonan, Portsmouth, NH (US)

(73) Assignee: GMO GLOBALSIGN PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,987

(22) Filed: Oct. 2, 2023

(65) Prior Publication Data

US 2024/0031149 A1    Jan. 25, 2024

Related U.S. Application Data

(63) Continuation of application No. 16/875,882, filed on May 15, 2020, now Pat. No. 11,777,728.

(60) Provisional application No. 62/848,927, filed on May 16, 2019.

(51) Int. Cl.
H04L 9/30        (2006.01)
H04L 9/08        (2006.01)
H04L 9/32        (2006.01)

(52) U.S. Cl.
CPC ............. H04L 9/30 (2013.01); H04L 9/0861 (2013.01); H04L 9/3263 (2013.01)

(58) Field of Classification Search
CPC ....... H04L 9/30; H04L 9/0861; H04L 9/3263; G06Q 2220/00; G06Q 20/065; G06Q 20/223; G06Q 20/38215
See application file for complete search history.

(56) References Cited

U.S. PATENT DOCUMENTS

| | | | |
|---|---|---|---|
| 2018/0227293 A1* | 8/2018 | Uhr | H04L 9/3268 |
| 2018/0278427 A1* | 9/2018 | Thakore | H04L 9/3268 |
| 2019/0005470 A1* | 1/2019 | Uhr | H04L 9/3239 |
| 2019/0295069 A1* | 9/2019 | Pala | G06Q 20/3678 |
| 2020/0074458 A1* | 3/2020 | Govindarajan | G06Q 20/3829 |
| 2020/0396089 A1* | 12/2020 | Guo | H04L 63/123 |
| 2022/0094542 A1* | 3/2022 | Wright | H04L 9/3247 |

* cited by examiner

*Primary Examiner* — Michael R Vaughan
*Assistant Examiner* — Ethan V Vo
(74) *Attorney, Agent, or Firm* — Aspiro Legal, LLC (57) ABSTRACT

The present invention overcomes problem of pseudonymous Blockchain transactions that preclude the identification of an individual or institutional identity that rely solely on a Blockchain address of a recipient in a Blockchain transaction. A system and method is provided that verifies transfers in an on-chain Blockchain Bitcoin transaction by using a sequence of Blockchain Bitcoin transactions that establish and confirm an identity of one or more parties to the transaction.

8 Claims, 9 Drawing Sheets

SYSTEMS AND METHODS FOR BLOCKCHAIN TRANSACTIONS WITH OFFER AND ACCEPTANCE

RELATED APPLICATIONS

This patent claims priority to and benefit of U.S. Provisional Patent Application No. 62/848,927, filed May 16, 2019, and U.S. patent application Ser. No. 16/875,882 filed May 15, 2020. All documents cited in this section are incorporated here by reference.

FIELD OF THE INVENTION

This disclosure relates generally to blockchains and, more specifically, to creating a sequence of verified blockchain transactions that can act as an offer and corresponding acceptance by verifying the identity of an intended recipient in a Blockchain Bitcoin transaction.

BACKGROUND OF THE INVENTION

Blockchain technology (sometimes simply called blockchain) is a relatively new technology that has been used to implement digital currency. It is described in a 2008 paper titled "Bitcoin: A Peer-to-Peer Electronic Cash System" by Satoshi Nakamoto, the entire contents of which are incorporated herein by reference. A block chain is a data structure that stores a list of transactions and can be thought of as a distributed electronic ledger that records transactions between a source identifier and a destination identifier. Transactions are bundled into blocks, and all blocks (except the first block) refer to the previous block or are linked to the previous block in the chain. The computer node maintains a block chain and cryptographically verifies each new block and thus the transactions contained in the corresponding block. This verification process is difficult to solve computationally, however authenticating involves solving a simple problem and is sometimes referred to as "proof of work".

The integrity of the entire blockchain (for example, the confidence that the previously recorded transaction has not changed) is preserved, which means that each block references a cryptographic hash value of the previous block. Therefore, when a block refers to a previous block, it becomes difficult to change or tamper with the data (e.g., a transaction) contained therein. This is because even a small change to the data affects the hash value of the entire block. Each additional block increases the difficulty of tampering with the contents of the previous block. Therefore, even if the contents of the blockchain become visible to everyone, it is virtually impossible to change.

The identifier used for the block chain transaction is created by a cipher creation method such as a public key cipher creation method. For example, the user can create a destination identifier based on the secret key. The relationship between the private key and the destination identifier can later be used to provide "evidence" that the user is associated with the output from the created transaction. In other words, the user can now create another transaction to "consume" the content of the previous transaction. Furthermore, since only the user knows the relationship between the destination identifier and the corresponding private key, even if the user can create many different destination identifiers (linked only through the private key) the user has anonymity. Accordingly, the overall relevance of the user with multiple transactions included in the blockchain can be kept secret from other users. While transaction details can be made publicly available on the distributed ledger, the underlying participants of these transactions can be kept secret because the identifier is linked to a secret key known only to the corresponding participant.

One of the challenges with public blockchains, including Bitcoin, is that because Bitcoin transactions are pseudonymous, it makes it difficult for a user to verify corresponding personal or institutional identities. As a consequence of being pseudonymous, Bitcoin transactions that transfer bitcoin from one party to another do not necessarily embody an offer and acceptance. For example, a transferring party (i.e., transferor) may transfer bitcoin to a bitcoin address of a recipient party (i.e., transferee) without his or her knowledge or consent. This lack of knowledge or consent in the digital realm of Bitcoin is anathema to the guiding principles of contract law, which requires an offer and acceptance.

As a consequence of the inherent lack of transparency in Bitcoin transactions, business associations may be hesitant to use Bitcoin because they cannot easily verify such identities to a comfortable degree. Although not desirable in all cases, such verification can be useful in complying with regulations, for example, know-your-customer (KYC) and anti-money-laundering (AML) obligations. Such obligations can include, for example, reporting or logging of information relating to transaction participation. Some business associations may be hesitant to use Bitcoin because they cannot easily verify such identities to a comfortable degree. This is because the identity of a recipient in a conventional Bitcoin transaction is not embedded in the transaction thereby raising significant risk that a malicious interloper has swapped the address of an intended recipient with his own. Bitcoin transactions are pseudonymous, using for example a Bitcoin address to designate a recipient. As a result, it is difficult to verify an identity of a recipient designated in a transaction. At least because such identity is not embedded in the transaction itself, there is significant risk that a malicious intermeddler has swapped an address of an intended recipient with his own.

As such, there is a potential for fraud that cannot be ignored when it comes to conducting transactions. Simple Bitcoin transactions that transfer bitcoin from one party to another do not necessarily embody an offer and acceptance as a consequence of this potential for fraud. For example, a transferring party (i.e., transferor) may transfer bitcoin to a bitcoin address of a recipient party (i.e., transferee) without his or her knowledge or consent. This lack of knowledge or consent in the digital realm of Bitcoin is anathema to the guiding principles of contract law, which requires an offer and acceptance. That is, at common law, a contract may require an offer and acceptance. An offer may be a willingness to enter into a binding agreement under certain terms. An acceptance may be an expression of unambiguous and unconditional assent to be bound by those terms. Without an acceptance, an offer may not become a legally enforceable contract.

Accordingly, there is a need for a system and associated method for creating verified transfers in Blockchain transactions, for example, Bitcoin Blockchain transactions such that the transactions operate as an offer and acceptance.

SUMMARY OF THE INVENTION

The present invention provides a system and associated computer-implemented method for executing a sequence of Blockchain transactions that verify the identity of an intended recipient and act as an offer and acceptance. Verifiable identity can increase efficiency in situations where addressing fraud and theft is critically important or required. In some embodiments, verifying the identity of an intended recipient in a Blockchain transaction may include checking the transferee's address against a publicly trusted digital certificate that certifies certain identifying information associated with a particular cryptographic public key. Merely possessing a corresponding private key, held by the intended recipient may be sufficient to verify the transferee's digital identity.

The invention is defined by the independent claims. The dependent claims define advantageous embodiments.

According to a first aspect, there is provided a system for executing a sequence of Blockchain transactions that operate as an offer and acceptance by verifying certain identity information of a transferee, characterized in that the system is operable to:
- (a) form a blockchain, by a first computing device, the blockchain having one or more nodes each node comprising a blockchain address,
- (b) establish, by a first server, a root-of-trust on the blockchain by providing a certification certificate associated with a first entity, wherein the certification certificate includes a field including a public key corresponding to a block chain address for which there is an unspent transaction output (UTXO) on the blockchain,
- (c) issue, from the first server, the certification certificate to the first entity,
- (d) create, by a second server, an issuing transaction that spends an unspent transaction output (UTXO) on the blockchain corresponding to the certification certificate associated with the first entity,
- (e) create, by a first computing device, an offer transaction containing a transfer output spendable by the public key of an identity token of the first entity, and
- (f) create, by a second computing device, an acceptance transaction that includes the transfer output as an input.

The invention is of advantage in that the system and associated computer-implemented method provide contractual elements that may be used to enable smart contracts on the Blockchain.

Optionally, in the system, an offeror can create an offer transaction that includes an output, which when spent operates as a specified offeree's acceptance which requires a signature by a private key of a corresponding identity token output.

Optionally, in the system, the offeror and offeree can collectively create an integrated contract transaction that embodies both offer and acceptance by requiring the offeree to provide and sign an identity token input to a single verified contract transaction.

According to a second aspect, there is provided a method of using a system for executing a sequence of Blockchain Bitcoin transactions that operate as an offer and acceptance, wherein the system is operable to establish and confirm the identity information of a transferee, characterized in that the method includes:
- a) forming, by a first computing device, a blockchain having one or more nodes, each node having a blockchain address, wherein a first node of the one or more nodes have a first blockchain address associated with a transaction,
- b) establishing, by a certification server, a certification certificate to establish a root output on the blockchain associated with a first entity, wherein the certification certificate comprises a root certificate specifying a public key corresponding to a blockchain address for which there is an unspent transaction output (UTXO) on the blockchain,
- c) issuing the certification certificate from the certification server to a first entity associated with the first computing device,
- d) creating, by an issuing server, an issuing transaction that spends an unspent transaction output (UTXO) corresponding to the certification certificate associated with the first entity,
- e) creating an offer transaction, by a first entity associated with a first computing device, including a transfer output spendable by the public key of the identity token of the first entity,
- f) creating an acceptance transaction, by a second computing device associated with a second entity, that includes the transfer output as input.

Optionally, the method may include the offeror repossessing a transfer output created in a Blockchain Bitcoin transaction if not accepted by an offeree within a specified time period. In this manner, the offeror can provide a time-limited offer.

Optionally, the method may include the offerree's acceptance in a P2PKH Blockchain Bitcoin transaction with one or more outputs reassigned to the offeree or reassigned back to the offeror to reduce ambiguity.

Optionally, the method may include the offeror and offeree signing a single contract' transaction.

In some embodiments, one or more of the following features may be included.
- a. The blockchain may be a bitcoin blockchain.
- b. The blockchain address may be a bitcoin address.
- c. The certification certificate may be an X.509 certificate.
- d. The address field may be an extension field of the X.509 certificate.
- e. server may be associated with a certification service.
- f. Personal or Institutional identity may be associated with the blockchain.
- g. Identity functionality may be maintained as separate from Bitcoin.

In some embodiments, an offeror (e.g., transferor) can create a 'contract' transaction with at least two inputs: (1) an 'offer' input corresponding to bitcoin to be transferred, and (2) an 'acceptance' input that consumes an offeree's 'identity tokens output. According to such an embodiment, in the 'contract' transaction, a 'transfer' output can be assigned to a specified Bitcoin address. Namely, the Bitcoin address of the intended recipient (e.g., transferee/offeree). The offeror can make the offer by digitally signing the 'contract' transaction.

In some embodiments, the intended recipient (e.g. transferee/offeree) can express his or her acceptance by digitally signing the afore-mentioned 'contract' transaction. The digital signature can both operate as an acceptance, and establish the intended recipient's (e.g., transferee/offeree) identity.

In some embodiments, the afore-mentioned 'contract' transaction can assign a 'transfer' output of the contract transaction to a specified Bitcoin address (e.g., a Bitcoin address of the transferee).

In some embodiments, the offeror can make an offer by digitally signing the 'contract' transaction.

In some embodiments, to verify the identity of an offeree in a Blockchain Bitcoin transaction, the offeror can stipulate that only a particular identity token can sign a valid acceptance transaction. In this manner, the identity information of an offeree in a transaction may be verified by the offeror checking the offeree's bitcoin address against a publicly trusted digital certificate. The digital certificate attests to the Bitcoin address of the offeree in various ways. For example, the digital certificate can include the Bitcoin address of the offeree or a corresponding cryptographic public key of the offeree in an extension. Alternatively, the certificate's cryptographic public key can correspond to the same public key from which the Bitcoin address derives. In this manner, an output on the Blockchain can be linked to a particular digital certificate, and thus, also to a CA verified personal or institutional identity. In certain instances, only the holder of the digital certificate's private key, presumptively the subject of the certificate, holds the corresponding private key required to spend the output on the Blockchain.

In some embodiments, it may be beneficial to represent identity as specific outputs on the Blockchain that must be unspent (i.e., UTXOs) to be valid. Additionally or alternatively, it may be beneficial to represent identity abstractly on the Blockchain as a shared key that can be used even if, for example, a CA revokes a corresponding digital certificate.

In one embodiment of the present invention, there are provided a computer program which comprises program code means for causing a computer to perform the steps of the computer-implemented method disclosed herein when said computer program is carried out on a computer as well as a non-transitory computer-readable recording medium that stores therein a computer program product, which, when executed by a processor, causes the method disclosed herein to be performed.

As will be appreciated by one skilled in the relevant field, a system for creating a sequence of verified blockchain transactions that verify the identity of an intended recipient and act as an offer and acceptance in a Blockchain transaction may be, for example, embodied as a computer system, a method, or a computer program product. Accordingly, various embodiments may take the form of an entirely hardware embodiment, an entirely software embodiment, or an embodiment combining software and hardware aspects. Furthermore, some embodiments may take the form of a computer program product stored on a computer-readable storage medium having computer-readable instructions (e.g., software) embodied in the storage medium. Various embodiments may take the form of web, mobile, wearable computer-implemented, computer software. Any suitable computer-readable storage medium may be utilized including, for example, hard disks, compact disks, DVDs, optical storage devices, and/or magnetic storage devices.

According to one aspect, an acceptance by an offeree should be unambiguous. In some embodiments, one way of a transferee expressing acceptance may be to self-assign an acceptance back to yourself. Alternatively, or in addition, this may be accomplished by including in a transaction, outputs of specific types and values.

It shall be understood that a preferred embodiment of the present invention can also be any combination of the dependent claims or above embodiments with the respective independent claim. For example, identity tokens, acceptance outputs, and other 'signaling' outputs could be implemented in a relatively unambiguous manner by using outputs and corresponding inputs having nominal values of zero. In such an implementation using zero-value 'tokens' is possible because Bitcoin's consensus rules allow a transaction to have both zero-value outputs and zero-value inputs having nominal values of zero, provided that, (1) the nominal amount of each input is not less than zero (i.e., it is not negative), and (2) the sum of the nominal output amounts is not greater than the sum of the nominal input amounts.

These and other aspects of the invention will be apparent from and elucidated with reference to the embodiments described hereinafter.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention.

Like numbers in the figures denote like elements.

DETAILED DESCRIPTION

Hereinafter, exemplary embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

The examples of the methods and systems discussed herein are not limited in application to the details of construction and the arrangement of components set forth in the following description or illustrated in the accompanying drawings. It will be understood to one of skill in the art that the methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements.

The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

One skilled in the art will recognize that, when describing blockchains, the term "block" is typically used to refer to blocks in a blockchain and the term "node" is typically used to refer to nodes in a lightning network. However, in this disclosure, the terms "block" and "node" are used interchangeably to refer to blocks in a blockchain, nodes in a lightning network, or both. The terms "block" and "node" may also be construed to mean any block or node appropriate in context of this disclosure.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks. The computer program instructions may also be stored on a carrier medium or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

A system and method is provided for verifying transfers by using a sequence of Blockchain Bitcoin transactions that establish and confirm an identity, whereby the sequence of Blockchain Bitcoin transactions operate as an offer and corresponding acceptance. Embodiments provide a system for establishing and confirming the identity information of a counterparty (i.e., transferee) to a transaction via a sequence of Blockchain Bitcoin transactions that operate as an offer and corresponding acceptance in a transaction. A certification authority (CA) initially establishes a 'root' output on the Blockchain that shares a private key with the CA's X.509 Root certificate. Thereafter, the CA creates an 'issuing' transaction by spending its 'root' output. An 'identity' output of this 'issuing' transaction is spendable by a public key specified in a digital certificate the CA issues to a user. The user can sign transactions with his or her corresponding private key to assert his or her personal identity on the Blockchain, and counterparties can require her signature to consummate verified transfers. A verified transfer may include a root certificate sharing a public and private key with a Bitcoin address of an unspent transaction output (UTXO) and issuing a digital certificate to a user that shares a private key with a Bitcoin address of the user and assigning value to the Bitcoin address sharing a private key with the user's certificate. The user may accept the transfer by re-assigning the transferred bitcoin to her own address.

Figure 1:
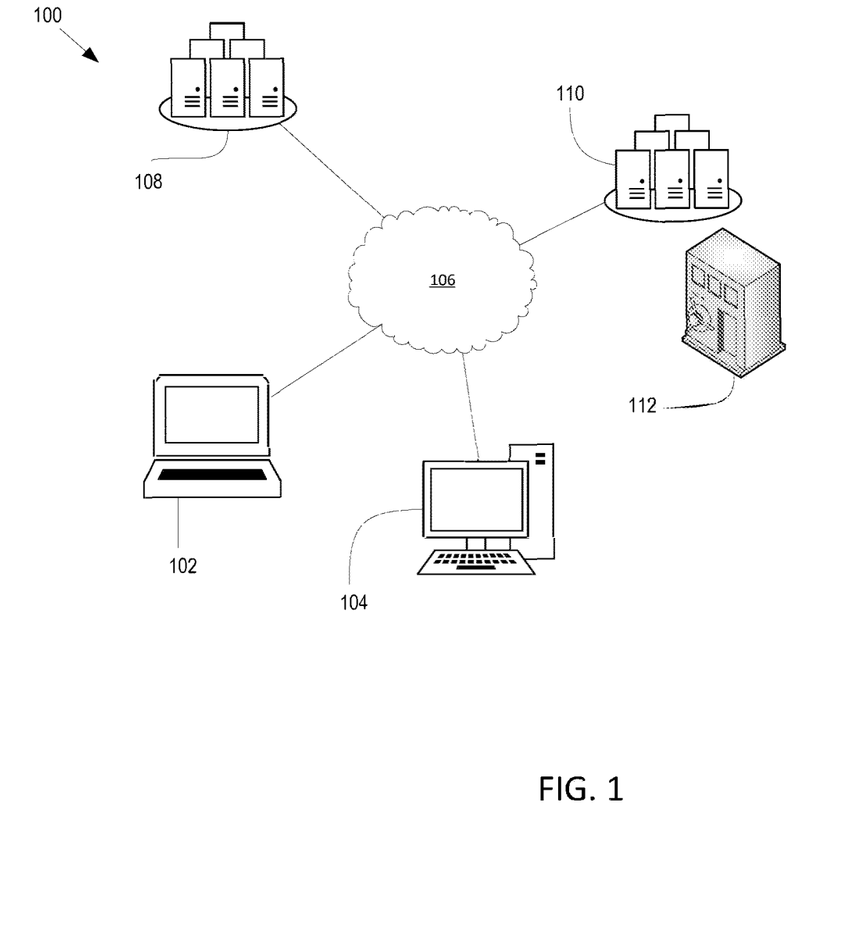
FIG. 1 is an illustration of a high-level architecture representing a manner of Bitcoin system operation including certification servers.

Referring to FIG. 1, a computing system 100 includes computing devices 102 and 104 communicating on network 106. Computing devices 102 and 104 may be any type of computing devices that can execute software instructions including, but not limited to, devices such as a desktop computer, a laptop computer, a mobile phone, a server, internet-of-things (IoT) sensor, embedded device, etc. Network 106 may be any type of network that allows computing devices to communicate with each other including, but not limited to, a WAN, a LAN, an internet, etc.

System 100 may also include one or more servers 108 that may be associated with a user registration and certification service. The user registration and certification service may be a service that issues and/or provides digital certificates that provide secure authentication of addresses, identity, transactions, signatures, etc. (for example, a certification authority (CA) corresponding to a public key infrastructure (PKI)). The user registration and certification service may also provide authentication using asymmetric cryptography (e.g., public-key cryptography using public/private key pairs) to establish the source of, or an entity's association with, data or transactions (e.g., by witnessing or authorizing a digital signature or transaction).

System 100 may also include servers 110 associated with an entity 112. The entity 112 may be a company, an individual, or any other legal entity with an identity that can be authenticated by servers 108. For example, a CA can verify a name, mailing address, Internet domain name, and Bitcoin address of an entity. Optionally, and also for example, a CA can establish ownership of a blockchain identifier (e.g., a Bitcoin address) by requiring an entity to prove ownership of a private key corresponding to the blockchain identifier (e.g., by providing a digital signature constructed using a private key corresponding to a Bitcoin address).

System 100 is shown as a relatively minimal system having two computing devices 102 and 104, servers 108 associated with a user registration and certification service, and servers 110 associated with an entity 112 communicating over a network 106. However, additional devices may also communicate over network 106 and interact with or be part of system 100. These devices are not shown for ease of illustration.

Figure 2:
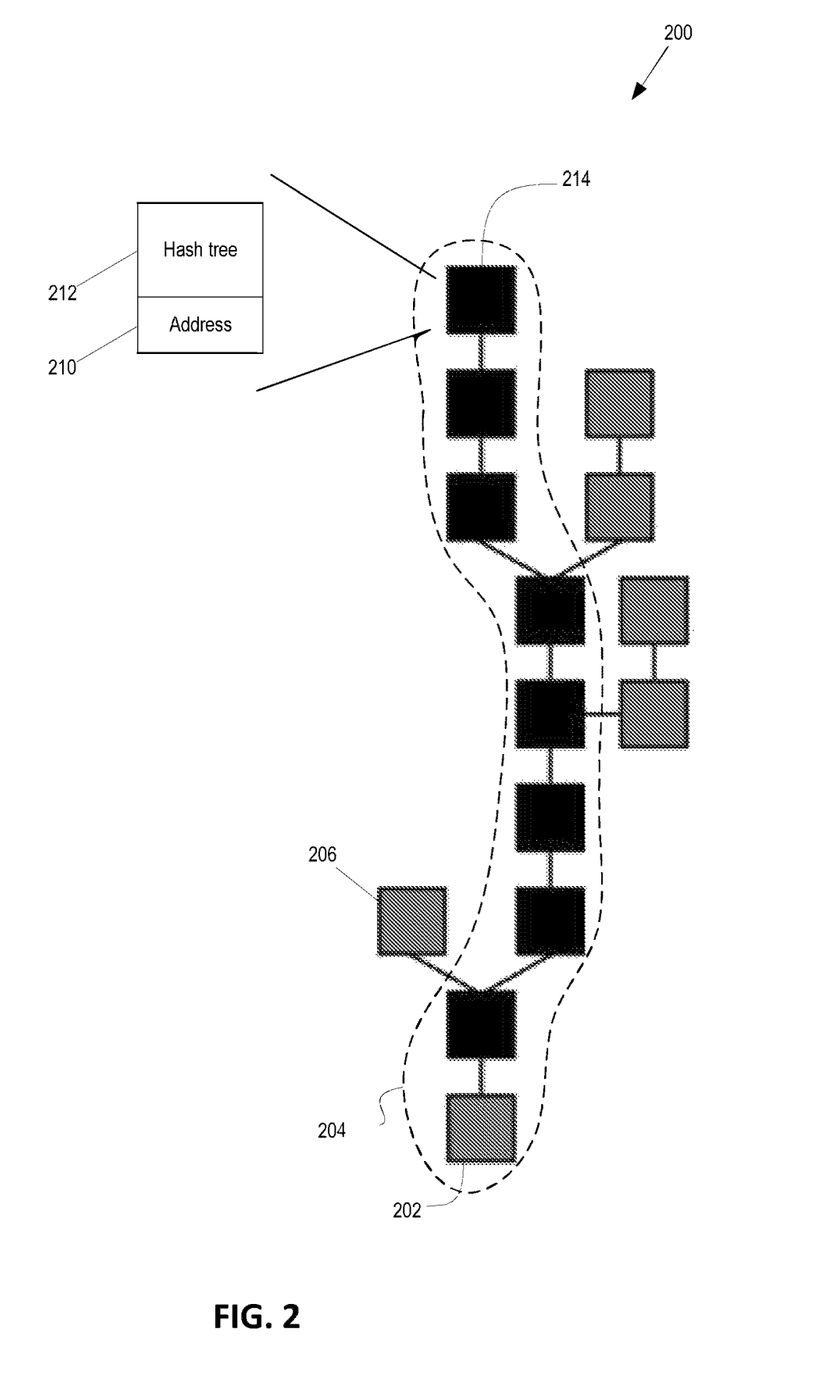
FIG. 2 is a block diagram of a blockchain.

Referring also to FIG. 2, a blockchain 200 may be associated with system 100. Blockchain 200 may be stored, in whole or in part, by computing devices 102 and 104, and by servers 110. Other devices, not shown, may also store the entirety or store part of blockchain 200. In embodiments, blockchain 200 may be a bitcoin blockchain, a lightning network etc. (Note that, although the lightning network is not necessarily a blockchain, the systems and techniques described in this disclosure may operate on or in conjunction with the lightning network.) Blockchain 200 may be a public blockchain that allow participation by any entity or individual, like the Bitcoin blockchain or the Ethereum blockchain. In other embodiments, blockchain 200 may be a private blockchain with a closed group of users and private transactions, or a hybrid blockchain that may be governed by a group or consortium.

Regardless of the type of blockchain 200, various entities may be associated with transactions in the block chain. For example, blockchain 200 may include a Blockchain bitcoin transaction that transfers funds from one entity to another. Optionally, the transaction may be associated with one or more source addresses (associated with entities authorizing inputs to the transaction) and/or a destination addresses (associated with entities potentially able to exercise rights over outputs of the transaction). Because of the secure nature of financial (and other) transactions, it may be beneficial if the parties to a transaction can authenticate the identity of the other parties of the transaction. For example, if the recipient is a bank, it may be beneficial for the transferor to authenticate the recipient address as associated with the proper bank.

Blockchain 200 may be created by, maintained by, and extended by computing devices such as devices 102 and 104. Blockchain 200 may include a series of blocks (also referred to as nodes in this disclosure) like origin block 202. The term "blockchain" may refer to the entire blockchain 200 structure or may refer to the longest uninterrupted chain within the structure. (e.g. blocks 204). Blockchain 200 may also include nodes (such as blocks 206) that branch from the main blockchain.

Each block may contain an address 210 associated with the block and used to accept and send blockchain transactions, and a hash tree 212 of data transactions. In embodiments, a block may be associated with a particular entity. Thus, the block's address 210 may also be associated with a particular entity. For example, if funds are transferred to address 210, those funds may become available to the entity associated with block 214.

The Lightning Network is a layer-2 protocol built on top of an underlying blockchain (e.g., Bitcoin). Pairs of users enter into agreements to negotiate in good faith secured by collateral. These agreements, called channels, can be recorded in blockchain 200 (for example, as 'funding' transactions). Each pair updates the channel by using ongoing negotiations and partially signed but unrecorded contracts (i.e., 'off-chain') to adjust the allocation of the channel's collateral and defer settlement on the Blockchain. To transfer funds, the sender updates unrecorded contracts with another party, who in turn updates one of his contracts with another party, and so on, until the process reaches the recipient. The result may be a chain of contractual updates.

Parties must negotiate in good faith (including by disavowing past revoked or updated contracts) or risk losing collateral in the lightning network. If negotiations break down and there is no dispute or breach, collateral can be returned according to the agreed allocation in the most recent contractual update.

By deferring recording to the Blockchain, the Lightning Network allows a higher transaction volume and near-instant confirmation:

The speed and capacity limits of the Blockchain itself do not directly limit Lightning transactions. Automated and near-instantaneous negotiations and contractual updates may not need to be recorded in the blockchain immediately—i.e., they can occur off-chain. However, in certain instances, the Blockchain limits the speed and volume of dispute resolution and settlement. Provided that disputes and settlements are much more infrequent than day-to-day transactions, the Lightning Network can achieve a very high degree of transactional scalability.

A standard Blockchain Bitcoin transaction is usually not accepted as final or irrevocable (e.g., "confirmed) until it is included in the Blockchain—i.e., until it is included in a block with some number of additional blocks chained after it. Before a transaction makes it into a block, it is not yet part of the Blockchain and may still be susceptible to double-spending. The Blockchain's proof-of-work does not protect a transaction that is unconfirmed.

In the Lightning Network, although settlement to the Blockchain is deferred, it is deferred in a trust-minimized way. When a Lightning payment is completed, it may immediately receive the trust-minimized protection that comes with Lightning Network transactions—i.e., if a counterparty breaches an unrecorded contract, she forfeits her collateral. As a result, Lightning payments, while off-chain and technically unconfirmed, are effectively final, nearly instantaneously.

In the Lightning Network, bitcoins may oscillate back and forth within each individual channel. In a Lightning transaction, a single bitcoin may not move in a single transaction all the way from the initial sender to the ultimate receiver. Instead, the Lightning Network may form a vast network of oscillating bitcoins, with each individual bitcoin only moving back and forth within a single channel.

Like transformers for alternating current, nodes in the Lightning Network can maintain channels of different values, creating large channels with other 'high-power' nodes, while directly maintaining arbitrarily small channels with other users. In doing so, such nodes can act as transformers, converting a very high capacity flow to manageably small flows well-suited for day-to-day consumer transactions. Likewise, such nodes can aggregate small flows travelling in a similar direction for bundled transport over higher capacity channels. Where endpoint nodes have limited network connectivity or computational resources, such high-capacity nodes may also be able to handle some routing and channel-monitoring tasks. For example, a low-capacity node can outsource route-determination, potentially securely, to an trusted, authenticated higher-capacity or well-connected node.

Additionally, because a Lightning channel must be funded, nodes may have a large amount of available funds and may maintain more (and higher-valued) channels. As highly connected hubs emerge in the Lightning Network, they will still be trust-minimized. Channels are protected by the rules of the Lightning Network, and nodes can unilaterally close channels.

While identities on the Lightning Network are largely static and public, transactions may be known only to counterparties—e.g. some partial information is available to intermediate nodes in a transaction, and some summary information is available on the public blockchain. A node's identity on the Lightning Network optionally can be associated with a public key.

Thus, in the Lighting Network, identity and reputation may be important to transactions. For example, reputation is important in seeking contracts and counterparties. Reputation enables parties to evaluate more efficiently whether a potential counterparty will honor representations about availability, connectivity, and fees. Reputation can be based on objectively observable network metrics, such as uptime, number and capacity of channels, and number of breaches and non-mutual settlements. Such information can be disseminated using trusted entities authenticated by a certification certificate.

Public identity allows for authentication of payees and merchants. In making purchases, for example, authenticated identities (e.g., using certification certificates associated with an entity and a public key) allow a user to verify that a payment is going to the intended merchant, and to validate invoices and receipts. Verified and authenticated identity is particularly important because it provides efficient protection against man-in-the-middle attacks, which are difficult to prevent in anonymized digital contexts without pre-existing trust.

Public key infrastructure (PKI), which can provide an efficient and contained point of trust, can address both of these needs-reputation and identity-without compromising the trust-minimized nature of the Blockchain.

For example, on the Lightning Network, a node can be represented by its public key and network identifier (e.g., an IP address or other endpoint identifier). That public key can correspond to the public key (or corresponding information in another field, for example, a subject attribute or X.509 extension) in a publicly trusted X.509 digital certificate. For example, referring again to FIG. 1, servers 108, which provide certification certificates, may provide those certification certificates (e.g., as X.509 certificates). This digital certificate, in turn, can be used to authenticate an identity of the node (by company or domain name, for example) as verified or confirmed by a certification authority (CA) or registration authority (RA). With authenticated Lightning nodes, users can, for example, ensure that payments are actually going to the intended merchant.

In some embodiments, a certificate (e.g., an X.509 certificate) issued for authentication in a layer-2 blockchain protocol (e.g., the Lightning Network) transaction, may include an invoice field that contains data relating to a potential transaction (e.g., destination, amount, time, signature of a destination or authorized party, or geographic location of one or participants). For example, if a merchant is requesting payment from a customer in a transaction for sale of goods or services, an X.509 certificate can include an invoice field (e.g., as a subject attribute or in an X.509 extension) that includes information related to the potential transaction (e.g., a standard Lightning Network invoice).

Figure 3:
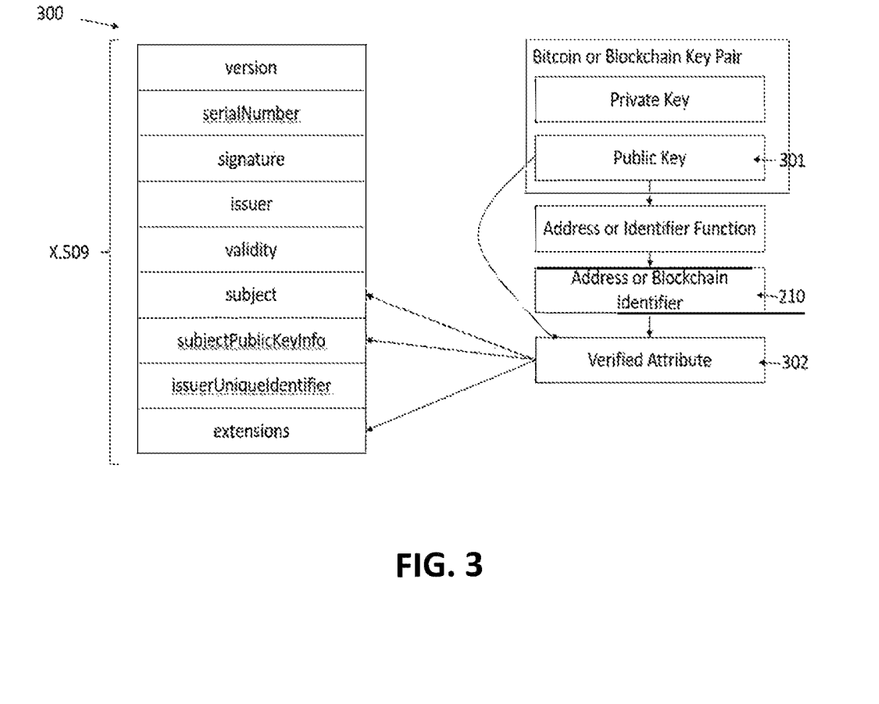
FIG. 3 is a block diagram of a certification certificate.

Referring to FIG. 3, a certification certificate 300 enabling verification of certain identity information associated with an entity may be issued by servers 108. Optionally, certification certificate 300 may comply with the X.509 format and may be an X.509 certificate. Optionally, certification certificate 300 may also be authorized or verified by a third-party, for example, some portions of or all of such certificate's data can be signed with a private key of a certification authority (CA) (e.g., a private key corresponding to a trusted or otherwise authorized digital certificate). In embodiments, address 210 and/or public key 301 may comprise, be used as, or be used to derive a verified attribute 302 and optionally may be included within a portion of certification certificate 300 signed or otherwise verified, for example, by a certification authority (CA) (e.g., signed by a CA's private key during issuance of certification certificate 300). A private key used by certification authority to sign certification certificate 300, may be provided by a trusted source, such as servers 108 which may be associated with a public certification service.

Certification certificate 300 may include various fields, including for example fields comprising, used as, or used to verify attributes 302. For example, certification certificate 300 can include a public key from which a verified Bitcoin address or blockchain identifier can be derived. Optionally, one or more fields in the certificate can contain one or more verified blockchain addresses (e.g., a Bitcoin address). The addresses may be the same address 210 found in blockchain block 214. Certification certificate 300 may also include information that identifies an entity, such as serial number, issuer name, validity, public key, unique ID, and other information including, but not limited to, information contained in fields shown as part of certification certificate 300. Optionally, some or all of such information may comprise, be used as, or be used to derive one or more verified attributes (e.g., a public key can comprise a verified attribute for an entity where the entity verifies possession of a corresponding private key). Thus, certification certificate 300 may associate and authenticate address 210 and/or public key 301 with a trusted entity.

Verified attributes 302 included in certification certificate 300 are not limited to blockchain addresses or public keys. For example, verified attribute may be an IP address, another type of network address, another unique identifier associated with a transaction within blockchain 200, an amount transferred in a transaction within blockchain 200, or any other data that can be associated with a blockchain transaction and/or an entity involved in the blockchain transaction. In embodiments, the verified attribute may be an address reference. For example, verified attribute 302 may indirectly reference an address via the public key of the X.509 certificate. Thus, certification certificate 300 can provide assurances that the entity listed in the certification certificate 300 is really the entity that is involved in the blockchain transaction associated with verified attribute 302.

Although shown as a separate field within the X.509 certificate, the verified attributes 302 may be stored anywhere within the X.509 certificate. Also, in embodiments, the verified attribute 302 may be stored separately from but associated with the X.509 certificate.

Figure 3A:
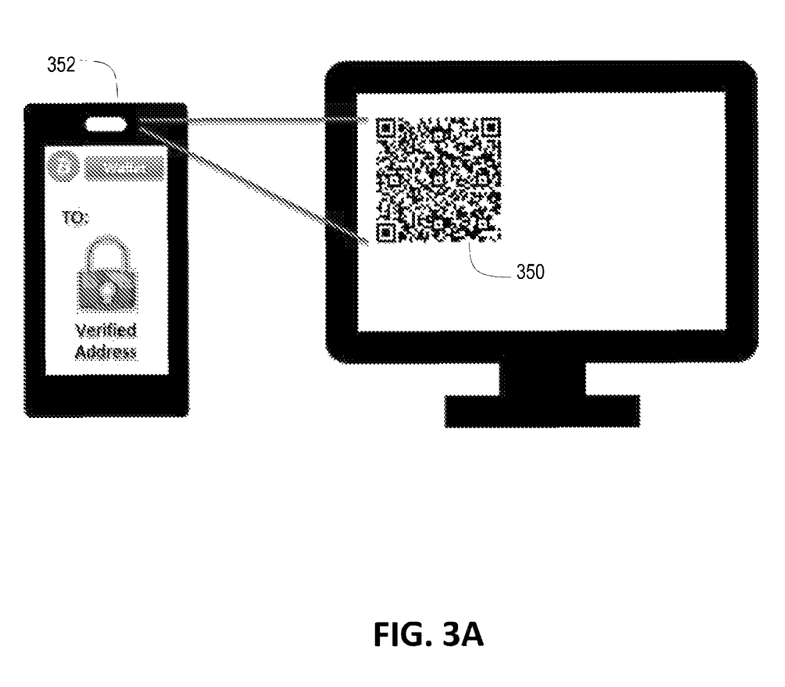
FIG. 3A is a diagram of a system including a QR code.

Referring to FIG. 3A, the certification certificate 300 can be encoded in a QR code 350. As an example, a QR code can, for example, encode a certificate in DER or PEM forms. QR code 350 may then be scanned by a computing device such as 352, which may include a hardware or software wallet. The computing device can verify the certification certificate in order to establish an identity of a counterparty in a transaction (e.g., an identity of a transferee in a Blockchain Bitcoin transaction). The computing device can notify a user after validating the certification certificate, for example, by displaying identity information contained in the certification certificate along with an indication that the certificate is valid. The certification certificate in the QR code may provide the wallet with verified identity of an entity associated with the QR code, or with the certification certificate, or with one or more potential or existing cryptocurrency or blockchain addresses, or with one or more potential or existing cryptocurrency or blockchain transactions (e.g., an on-chain Blockchain Bitcoin transaction referencing or including a Bitcoin address), for example, by including a cryptocurrency or blockchain address, or public key corresponding to such address.

Optionally, the wallet can then verify the authenticity of the information based on the certification certificate. Also, optionally, the wallet can also verify the certificate in the QR code by, for example, requesting that servers 108 authenticate the certification certificate contained in the QR code, for example. The wallet can then engage in a transaction with the address with confidence that they are conducting transactions with the verified entity.

QR code 350 may, for example, encode both a certification certificate and an invoice. In certain instances, the invoice may be contained within the certification certificate. Additionally, or alternatively, QR code 350 may encode a certificate that contains information other than or in addition to cryptocurrency addresses or identifiers. For example, the QR code may contain a certification certificate that includes a URL, an account identifier, a user identifier, or a rolling or periodically changing identifier (e.g., an AliPay™, Line™, or WeChat Pay™ payment URL or account number).

Thus, for example, when an entity scans the QR code, the entity can verify the certification certificate and the information contained in the certificate or QR code to gain assurance that the QR code (and information within the QR code) is associated with the correct source.

Optionally, a QR code can encode an online location (e.g., a URL) or interface (e.g., an Internet-accessible API) where a certification certificate can be retrieved. A hardware device or software program (e.g., a hardware Bitcoin wallet) can then retrieve the certification certificate (e.g., by downloading it from a specified URL) and validate the certificate. For example, a user could use a Bitcoin wallet on a mobile device to scan a QR code encoding or otherwise referencing a URL, to retrieve a certification certificate from the URL, and to verify the retrieved certification certificate, including for example verifying identity information and a Bitcoin address contained within or derived from the certificate.

Optionally, the QR can include or encode information in addition to a location from which a certificate can be retrieved. For example, a QR code can include a destination blockchain or cryptocurrency address, along with a URL from which a certification certificate can be retrieved. Optionally, the certificate can be used to establish an identity corresponding to a cryptocurrency or blockchain address, and to ensure that such cryptocurrency or blockchain address matches the address encoded or included in the QR code. Optionally, the retrieved certificate can be used to check a digital signature included in, attached to, or otherwise related to information contained in the QR code (e.g., by checking that data included in the QR code has been validly signed by a private key corresponding to the certificate).

The present invention provides a method for using a system for executing a sequence of Blockchain Bitcoin transactions that operate as an offer and acceptance, wherein the system is operable to establish and confirm the identity information of a counterparty (i.e., transferee) to a transaction. More generally, this sequence of Blockchain Bitcoin transactions can operate as an offer and corresponding acceptance. The method is described at a top level with respect to FIG. 4 and at a more detailed level with respect to FIG. 5.

Figure 4:
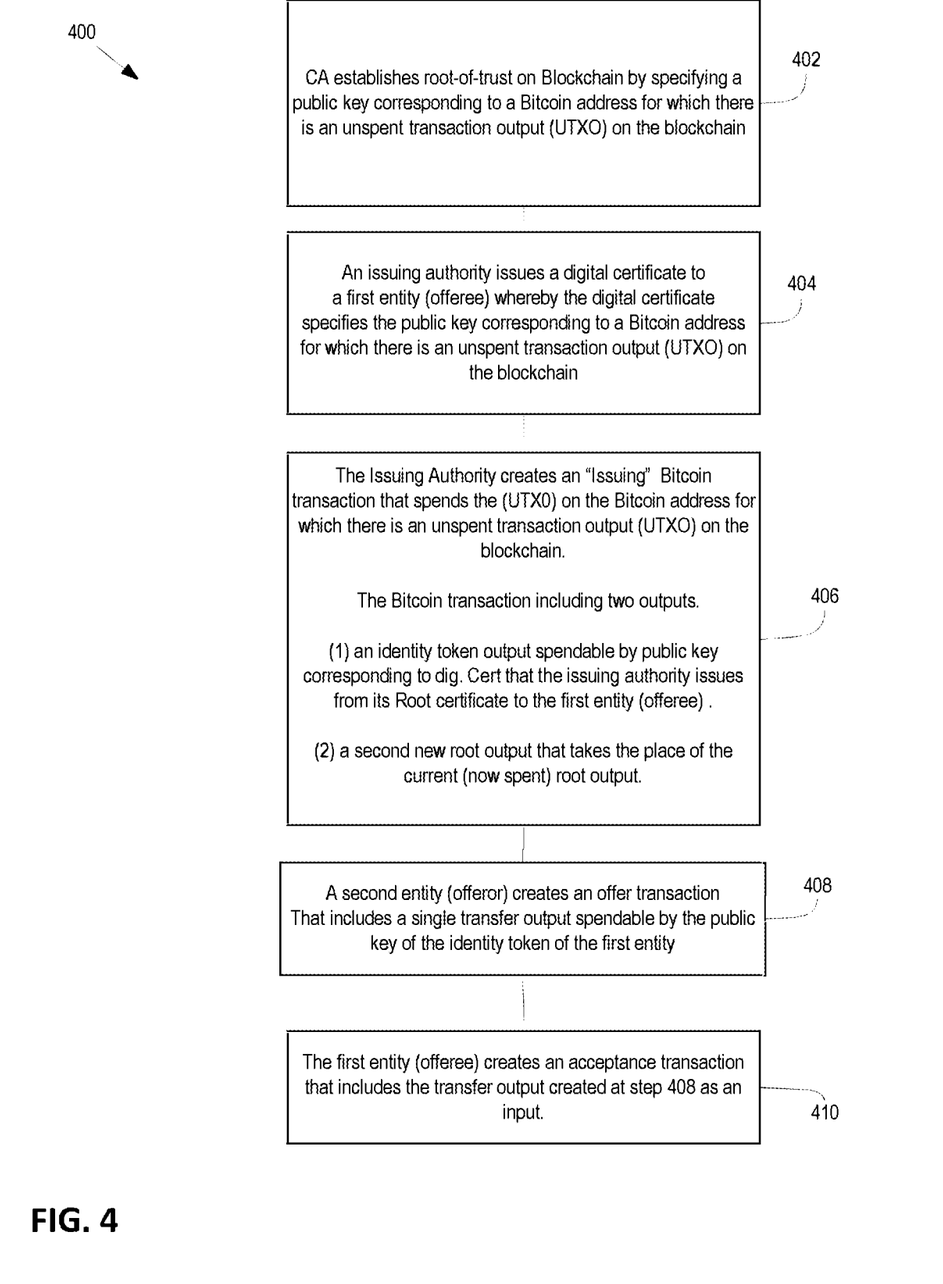
FIG. 4 is a top-level flowchart of a process for using a system for executing a sequence of Blockchain Bitcoin transactions that operate as an offer and acceptance, wherein the system is operable to establish and confirm the identity information of a counterparty (i.e., transferee) to a transaction.

Referring to FIG. 4, a flowchart describes a method 400, described at a top level, for using a system for executing a sequence of Blockchain Bitcoin transactions that operate as an offer and acceptance, wherein the system is operable to establish and confirm the identity information of a counterparty (i.e., transferee) to a transaction, characterized in that the method includes:

In step 402, a certification authority (CA) establishes a 'root' output on a Blockchain. This 'root' output can share a private key with the CA's X.509 Root certificate. The 'root' output specifies a public key corresponding to a Bitcoin address for which there is an unspent transaction output (UTXO) on the Blockchain.

In step 404, an issuing authority issues a digital certificate to a first entity (e.g., an offeree). The digital certificate may be a X.509 digital certificate. The digital certificate can certify, (i.e., attest to) a bitcoin address for which there is an unspent transaction output (UTXO) on the Blockchain in various ways. For example, the digital certificate can include the Bitcoin address or a corresponding cryptographic public key in its subject or in an extension. Alternatively, the digital certificate's cryptographic public key can correspond to the same public key from which the Bitcoin address derives.

In step 406, the issuing authority creates an "issuing" Blockchain Bitcoin transaction that spends the (UTXO) on the Bitcoin address specified at step 402. In an embodiment, this Blockchain Bitcoin transaction may include two outputs. A first output corresponding to an identity token output spendable by a public key corresponding to the digital certificate that was issued by the issuing authority to the first entity. A second "new root" output that takes the place of the current (e.g., now spent) root output.

In step 408, A second entity (i.e., "offeror") creates an "offer" transaction. The "offer" transaction includes a single output that is a "transfer" output spendable by the public key of the identity token of the first party (i.e., "the offeree"). Optionally, in some embodiments, claiming the "transfer" output can require a second signature corresponding to a freshly generated Bitcoin address. In some embodiments, the second signature can also specify a time-lock of limited duration after which the offeror can revoke the unclaimed "transfer" output.

In step 410, the first entity (e.g., offeree) creates an 'acceptance' transaction that includes as an input, the "transfer" output, which was created in the 'offer' transaction at step 408. To create this "acceptance" transaction, the offeree must sign the claimed transfer output with the private key corresponding to his or her identity token, thus establishing his or her digital identity. An offeree can accept an offeror's 'verified transfer' by spending a 'transfer' output of an 'offer' transaction, such as the one created at step 408. In some embodiments, the offeree's 'acceptance' transaction can be a P2PKH Blockchain Bitcoin transaction, which may reduce ambiguity by including one or more outputs reassigned to himself (i.e., the offeree) or reassigned back to the offeror.

Figure 5:
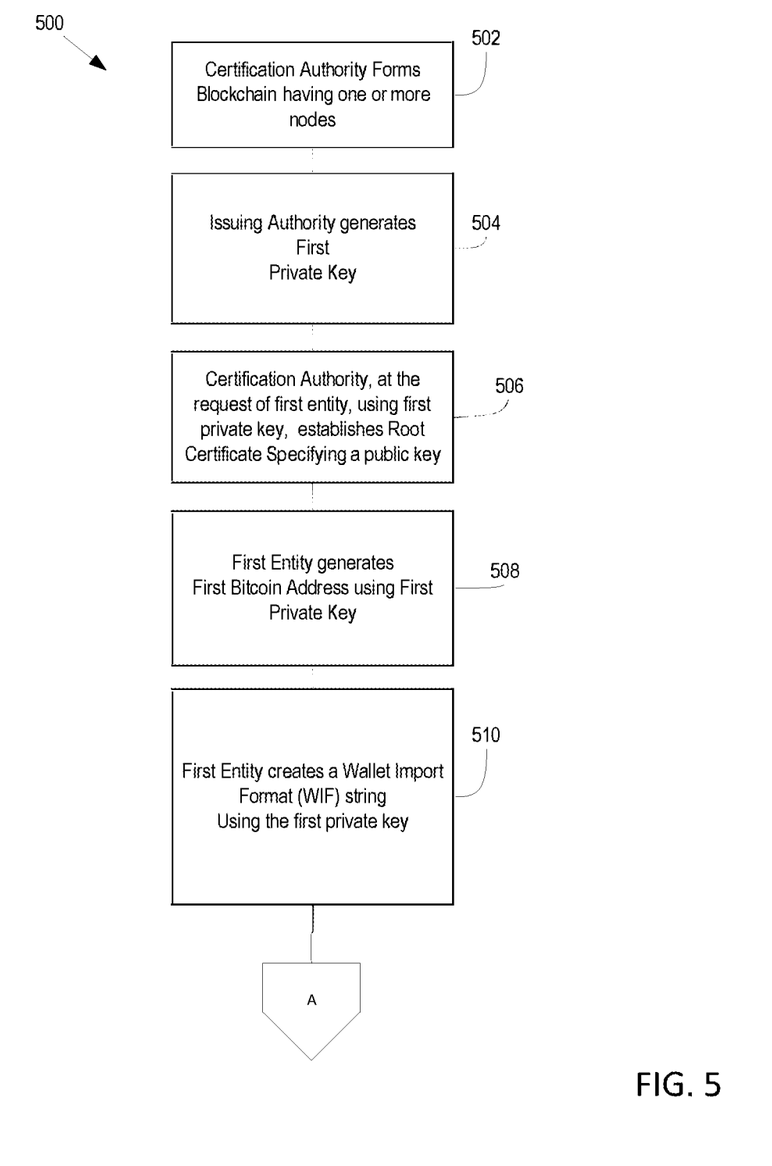
FIG. 5 is a more detailed flowchart of FIG. 4 of a process for using a system for executing a sequence of Blockchain Bitcoin transactions that operate as an offer and acceptance, wherein the system is operable to establish and confirm the identity information of a counterparty (i.e., transferee) to a transaction.

Referring to FIG. 5, a flowchart describes the method 400 of FIG. as a more detailed process 500 for verifying certain identity information of a transferee in a transaction that operates as an offer and acceptance on a Bitcoin Blockchain. Notably, processes 400 and 500 may be used by an entity that wants to gain assurance of the identity of the other parties to a transaction.

In step 502, a certification authority, on servers 108, forms a blockchain. The blockchain having one or more nodes, each node having a blockchain address, wherein a first node of the one or more nodes has a first blockchain address associated with a transaction. The blockchain may be stored on computing device 102 or 104.

Create Issue Transaction (Steps 504-524)

In step 504, an issuing authority, on servers 108, generates a first private key, which may be a secp256k1 elliptic curve private key. The first private key is a single unsigned 256 bit integer of 32 bytes and is essentially a randomly generated 'secret' number, which is known only to the person that generated it. The range of valid private keys is governed by the "secp256k1 ECDSA standard" used by Bitcoin. The public key corresponding to the private key does not need to be kept secret.

In step 506, the certification authority, on servers 108, at the request of the first entity, and using the first private key, generates a root certificate, specifying a public key. The root certificate comprises a field containing the public key corresponding to the blockchain address on the blockchain formed at step 502 for which there is an unspent transaction output (UTXO) on the blockchain.

In step 508, a first entity, on a computing device 102, generates a first Bitcoin address using the first private key generated at step 506. The generated first Bitcoin address is same as the certification authority's (CAs) 'root' Bitcoin address. Step 508 includes sub-steps 510, 512.

In sub-step 510, the first entity, on a computing device 102, creates a Wallet Import Format (WIF) string using the first private key generated at step 504.

In sub-step 512, using the WIF string from sub-step 510, the first entity imports the first private key into a Blockchain Bitcoin transaction system. A bit coin transaction system is a system in which a customer deposits cash on the spot using a financial automatic machine and purchases a bit coin from a bit coin exchange or sells his own bit coin to a bit coin exchange It is possible to easily and conveniently trade the bit coin in cash by using the financial automatic machine installed in various places, thereby enabling the use of the bit coin to be activated.

In step 514, an issuing authority, on servers 108, generates a Blockchain Bitcoin transaction with an output spendable by the public key of the CA's Root certificate. This is the CA's 'root' output.

In step 516, an issuing authority, on servers 108, generates a second private key. The second private key is a single unsigned 256 bit integer of 32 bytes and is essentially a randomly generated 'secret' number, which is known only to the person that generated it. The range of valid private keys is governed by the "secp256k1 ECDSA standard" used by Bitcoin.

In step 518, an issuing authority, on servers 108, generates a second Bitcoin address using the second private key generated at step 512. This is the Bitcoin address of the first user's 'identity token'.

In step 520, a certification authority, on servers 108, generates a certificate signing request (CSR) for a first user. In one embodiment, the CA performs a full identity investigation and authentication process when a party requests a digital certificate as part of an enrollment process. However, once this enrollment process is complete, and whenever the first party submits the CSR, the CA automatically issues a digital certificate in response.

In step 522, an issuing authority, on servers 108, issues a leaf certificate to the first user from the first user's CSR generated at step 516.

In step 524, an issuing authority, on servers 108, creates an "issuing transaction." Using the first private key of the CA's root address, the issuing authority creates and signs a Blockchain Bitcoin transaction including the CA's root output as an input. The "issuing transaction" further includes an output spendable by the Bitcoin address of the first user's identity token. In some embodiments, the "issuing transaction" can be a standard Blockchain Bitcoin transaction with an "identity token" output spendable by a pay-to-pubkey-hash (P2PKH) Bitcoin address (i.e, a regular Bitcoin address). In other embodiments, spending an "identity token" output of an "issuing" transaction can require a 1-of-2 multisignature redemption script (i.e., it can be a "multsig" wallet). In such a case, for example, a user's identity token can be valid only while the user's identity token output is unspent. Optionally, either the issuer (e.g., a CA) can revoke, or the user can invalidate, the user's identity token by spending it (e.g., consuming it). Optionally, a user's acceptance of a CA's offer of identity can also be a P2PKH Bitcoin transaction, perhaps including one or more zero-value outputs, for example, self-assigned or assigned back to the issuing CA.

Creating an Offer Transaction (Steps 526-530)

In step 526, a first entity, on a computing device 102, creates an 'offer' transaction having a 'transfer' output spendable by the public key of the identity token output of the first party. Step 522 includes sub-steps 524, 526. In some embodiments, the 'transfer' output can require two signatures from an offeree. For example, the two required signatures can correspond to (1) a freshly generated receiving address, and (2) the offeree's 'identity token'.

In sub-step 528, a first entity, on a computing device 102, generates a third private key. The third private key is a single unsigned 256 bit integer of 32 bytes and is essentially a randomly generated 'secret' number, which is known only to the person that generated it. The range of valid private keys is governed by the "secp256k1 ECDSA standard" used by Bitcoin.

In sub-step 530, a first entity, on a computing device 102, creates and signs a Blockchain Bitcoin transaction with an output spendable by the Bitcoin address of the first user's 'identity token' (e.g., the 'transfer' output). In some embodiments, an 'integrated' contract transaction may be created in lieu of signing a Blockchain Bitcoin transaction by the first entity. The 'integrated' contract transaction may include an input corresponding to the first user's 'identity token' output, thus requiring a signature on the transaction from the first user. In some embodiments, the private key of the first user may be used to sign the 'integrated' contract transaction. In some embodiments, publication or submission of a fully-signed 'contract' transaction can operate as both an offer and acceptance. 'Integrated' contract transactions are discussed more fully further below.

Creating a Verified Acceptance Transaction

In step 532, a second entity, on a computing device 104, creates a verified acceptance transaction.

Integrated Contracts

In some embodiments, an 'integrated' contract transaction may be created in lieu of signing a Blockchain Bitcoin transaction by the first entity, as discussed at sub-step 530 above. In the case where an 'integrated' contract is created, the 'integrated' contract transaction may include an input corresponding to the first user's 'identity token' output, thus requiring a signature on the transaction from the first user. In some embodiments, the private key of the first user may be used to sign the 'integrated' contract transaction. In an embodiment in which the offeree expresses his or her acceptance by signing an 'identity token' input to an 'integrated 'contract' transaction, signing can proceed as follows:

a. An offeror can construct an inchoate 'contract' transaction and sign his inputs with a particular type of signature. In an embodiment, the offeror can specify a SIGHASH_SINGLE flag that, with respect to the transaction's outputs, commits only to a particular 'transfer' output. For example, a returned remainder.

b. The offeree can express acceptance, and thus complete a 'contract' transaction by signing her 'identity token' input to the 'contract' transaction with a special type of signature. For example, the offeree might accept a 'verified transfer' by signing with a SIGHASH_SINGLE flag that, with respect to the transaction's outputs, commits only to a 'transfer' output the offeree wishes to accept.

Reducing Ambiguity in an Offeree's Acceptance

In the afore-mentioned embodiments, an offeree's acceptance can be represented as a transaction containing an output reassigning a 'transfer' output to the offeree. It is conceivable that the offeree could create such an acceptance transaction for some unknown reason without intending to actually express acceptance, in particular of any implicit terms. Integrating an offer and acceptance into a single transaction greatly reduces this potential ambiguity. In an embodiment, resolving such ambiguities may require the use of a transaction type or opcode that can both unambiguously indicate acceptance of an offer and also incorporate by reference (e.g., by hash) definite term offers, especially any terms not secured or automatically executed by the Blockchain's consensus rules. For example, in an embodiment, a time-lock of limited duration can be used. After the time-lock has expired, a spending path may become invalid. Such a mechanism could allow an offeror to provide a time-limited offer, by providing automatic revocation of the offer after a certain amount of time. This might also reduce ambiguity that can result from, for example, providing transaction revocation by allowing a new, additional spending path after a specified period-a technique that can result in a race condition.

Figure 6:
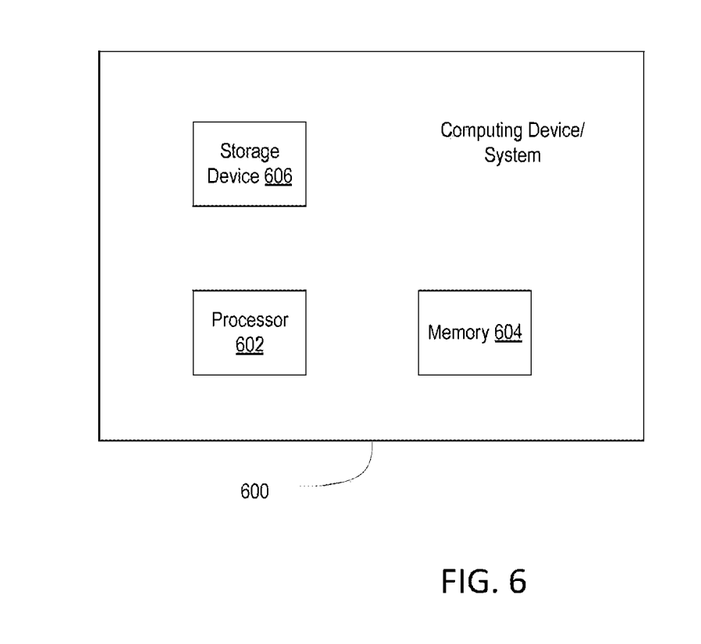
FIG. 6 is a block diagram of a computing device.

Computing system 600 includes a processor 602 (which may be the same as or similar to processor 110), a random access memory (RAM) 604, and a storage device 606, which may be a hard drive, a CD, a DVD, a flash drive, or any other type of nonvolatile memory. Software instructions may be stored in RAM 804 and/or storage device 606. Processor 602 may be coupled to storage device 606 and/or RAM 704 so that processor 602 can read the software instructions. As processor 602 reads the software instructions, the software instructions may cause processor 602 to perform operations, as described above, for computing the position of a magnetic target. Although not shown, processor 602 and/or system 600 may include other inputs and outputs, such as inputs for receiving the signals from the sensing elements, GPIO, power inputs, or other interfaces such as USB, SATA, HDMI, and the like.

The systems and techniques described above can be for verification of an entity involved in any blockchain transaction. For example, a publicly trusted X.509 digital certificate would allow a user (and software and hardware wallets) to verify that a particular blockchain address is in fact controlled by the intended recipient rather than a man-in-the-middle. A software or hardware wallet can also use an X.509 digital certificate to verify the identity of a recipient.

The systems, devices, and methods described above are example systems, devices, and methods shown for the purpose of understanding and illustration. Variations on these systems, devices, and methods are within the scope of the disclosure. Also, equivalent systems, devices, and methods are within the scope of the disclosure. Flowcharts illustrated in the figures and described in the disclosure do not necessarily require any particular order of the steps. Also, various steps may be added, removed, rearranged, and reordered as desired to produce the same or similar results and remain within the scope of this disclosure.

Various embodiments are described in this patent. However, the scope of the patent should not be limited to the described embodiments, but rather should be limited only by the spirit and scope of the following claims. All references cited in this patent are incorporated by reference in their entirety.

The invention claimed is:

1. A system, comprising a non-transitory computer readable storage medium executable by a processor, for executing a sequence of verified blockchain transactions that operate as an offer and acceptance by verifying certain identity information of a transferee, wherein the system is operable to:

form a blockchain by one or more servers, the blockchain including one or more nodes, and wherein a first node of the one or more nodes of the blockchain has a first blockchain address with an unspent transaction (UTXO);

create, by the one or more servers, a first private key corresponding to a root certification authority's identity;

establish, at the request of a first entity/offeree, using the first private key, a root-of-trust on the blockchain, wherein establishment of the root-of-trust comprises providing a root certification certificate associated with the first entity/offeree, the root certification certificate including a first field including a public key corresponding to the blockchain address for which there is the unspent transaction output (UTXO) on the blockchain;

generate, by the first entity/offeree, a first blockchain bitcoin address using the first private key, wherein the first bitcoin address is the same as a root bitcoin address of the certification authority;

generate, a blockchain transaction with an output spendable by the public key of the root certificate;

generate, a second private key corresponding to an issuing authority's identity;

generate, using the second private key, a second blockchain bitcoin address as the bitcoin address of an identity token of the first entity/offeree;

issue, a leaf certificate to the first entity/offeree, from the root certification certificate associated with the first entity/offeree;

generate, using the first private key, an issuing transaction including two outputs, an identity token output spendable by a public key corresponding to the leaf certificate and a new root output that replaces a current root output; and create, by a computing device of the first entity/offeree, an acceptance.

2. The system of claim 1, further comprises:

creating by a second entity/offeror's computing device, an offer transaction including a transfer output spendable by a public key of the first entity/offeree's identify token.

3. The system of claim 2, wherein the act of creating, by the computing device of the first entity/offeree, an acceptance further comprises:

an acceptance transaction including the transfer output of the offer transaction as an input.

4. The system of claim 2, wherein the act of creating an offer transaction by the second entity/offeror's computing device comprises:

generating a third private key;

establishing an identity corresponding to a user of the third private key; and creating the transfer output of the offer transaction using the third private key to create a blockchain transaction with an output spendable by the bitcoin address of the identity token of first entity/offeree.

5. The system of claim 2, wherein the act of creating an offer transaction comprises:

adding an input to the first user's identity token output requiring a signature on the offer transaction from the first entity/offeree.

6. The system of claim 2, wherein the act of creating an offer transaction comprises:

including an output in the offer transaction which when spent operates as a specified offeree's acceptance, wherein said output requires a signature by a private key of a corresponding identity token output.

7. The system of claim 3, wherein the act of creating an acceptance transaction comprises signing the transfer output with a private key corresponding to the identity token of the first entity/offeree.

8. The system of claim 1, wherein the root certification certificate is associated with a cryptographic public key.

* * * * *